United States Patent
Hsieh et al.

(10) Patent No.: US 6,834,617 B1
(45) Date of Patent: Dec. 28, 2004

(54) AQUARIUM BACKGROUND SETTING

(75) Inventors: Han Chang Hsieh, Suzhou (CN); Xiao Hong Liu, Suzhou (CN)

(73) Assignee: Suzhou Good View Aquaria Technology Co., Ltd., Jiangsu Province (CN)

( * ) Notice: Subject to any disclaimer, the term of this patent is extended or adjusted under 35 U.S.C. 154(b) by 0 days.

(21) Appl. No.: 10/658,830

(22) Filed: Sep. 8, 2003

(51) Int. Cl.⁷ ............................................. A01K 61/00
(52) U.S. Cl. ................................ 119/256; 119/253
(58) Field of Search ................................. 119/256, 257, 119/258, 253

(56) References Cited

U.S. PATENT DOCUMENTS

| | | | | |
|---|---|---|---|---|
| 460,810 A | * | 10/1891 | Gunther | 119/256 |
| 3,059,091 A | * | 10/1962 | Wenzel | 119/256 |
| 3,121,417 A | * | 2/1964 | Goldman et al. | 119/253 |
| 4,006,711 A | * | 2/1977 | Frank | 119/256 |
| 4,191,129 A | * | 3/1980 | Renny | 119/253 |
| 4,353,327 A | * | 10/1982 | Shroyer | 119/257 |
| 4,708,089 A | * | 11/1987 | Goldman et al. | 119/248 |
| 4,974,545 A | * | 12/1990 | Jones | 119/256 |
| 5,078,093 A | * | 1/1992 | Flaherty | 119/256 |
| 5,090,357 A | * | 2/1992 | Pucci | 119/256 |
| 5,090,358 A | * | 2/1992 | Waldman | 119/257 |
| 5,749,320 A | * | 5/1998 | Sydenstricker | 119/253 |
| 6,230,654 B1 | * | 5/2001 | McNeil | 119/256 |
| 6,327,997 B1 | * | 12/2001 | Terry et al. | 119/246 |
| 6,415,739 B1 | * | 7/2002 | Orendorff et al. | 119/248 |
| 6,422,175 B1 | * | 7/2002 | Rudolph | 119/256 |
| 6,505,428 B1 | * | 1/2003 | Williams-King et al. | 40/661 |

FOREIGN PATENT DOCUMENTS

CN     01263510.3     9/2002

* cited by examiner

Primary Examiner—Yvonne R. Abbott
(74) Attorney, Agent, or Firm—Merchant & Gould P.C.

(57) ABSTRACT

A background setting for an aquarium having front and rear walls and opposite left and right side walls. The setting comprises a water-resistant background sheet bearing a background scenery for direct submersion in the water of the aquarium to cover the rear wall, and a fixture for fixing the background sheet inside the aquarium.

8 Claims, 4 Drawing Sheets

AQUARIUM BACKGROUND SETTING

The present invention relates to a background setting for an aquarium or fish tank for keeping living animals or plants.

BACKGROUND OF THE INVENTION

The provision of a background scenery, typically in the form of a background sheet, to aquariums is known, for creating a more realistic and attractive living habitat environment. The background sheet is usually attached to the back of the tank, but accumulation of unwanted substance such as moisture or dust between the tank and the sheet is inevitable, that fouls the scenery.

Chinese Patent No. 01263510.3 discloses the use of a transparent panel fixed immediately in front of the rear tank wall to form a narrow gap in communication with the interior of the tank for holding a background sheet in the tank water. As the sheet is submerged in the tank water, the scenery it displays can more clearly and directly be seen.

However, the use of an extra panel, albeit transparent, in front of the background sheet reduces visibility of the scenery. The panel is also prone to fouling by algae for example. Such a double-walled structure is also complicate and therefore expensive to manufacture.

The invention seeks to mitigate or at least alleviate such problems by providing an improved aquarium background setting.

SUMMARY OF THE INVENTION

According to the invention, there is provided a background setting for an aquarium having front and rear walls and opposite left and right side walls. The setting comprises a water-resistant background sheet bearing a background scenery for direct submersion in the water of said aquarium to cover said rear wall, and a fixture for fixing the background sheet inside said aquarium.

Preferably, the fixture comprises a groove provided at the bottom of said tank, the groove opening upwards for holding a bottom edge of the background sheet.

In a preferred embodiment, the background sheet is arranged to cover also said left and right side walls.

More preferably, the background sheet is arranged to extend from a front left corner of said tank and close to said left wall, then turns smoothly to said rear wall and extends therealong, then turns smoothly to said right wall and extends close thereto, and finally terminates at a front right corner of said tank.

Further more preferably, the fixture comprises a groove provided at the bottom of said tank, which extends and turns in substantially the same profile as the background sheet and opens upwards for holding a bottom edge of the background sheet.

In a preferred embodiment, the fixture comprises a plurality of suction members for holding a top edge of the background sheet to said tank.

More preferably, the top edge of the background sheet has a plurality of holes for engagement by the suction members respectively.

In a preferred alternative, the fixture comprises a removable mount fixedly supporting the background sheet thereon before they are positioned inside said tank.

More preferably, the mount comprises a planar middle section for extending over said rear wall and opposite left and right side sections curved smoothly therefrom for extending over said left and right side walls.

In another preferred alternative, the fixture comprises a pair of scroll rollers for use within opposite left and right sides of said tanks, on which rollers opposite ends of the background sheet are wound.

BRIEF DESCRIPTION OF DRAWINGS

The invention will now be more particularly described, by way of example only, with reference to the accompanying drawings, in which:

FIG. 7 is a cross-sectional view of the aquarium of

FIG. 6 taken along line VII—VII; and

DETAILED DESCRIPTION OF PREFERRED EMBODIMENT

Figure 1:
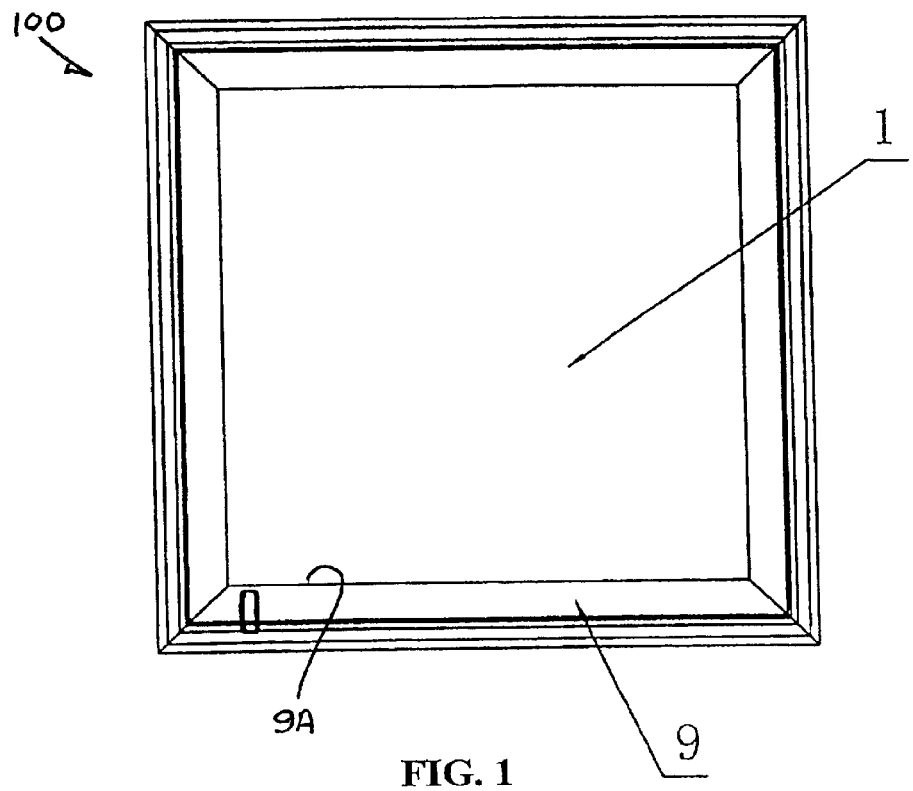
FIG. 1 is a front view of an aquarium that incorporates an embodiment of a background setting in accordance with the invention.
Figure 2:
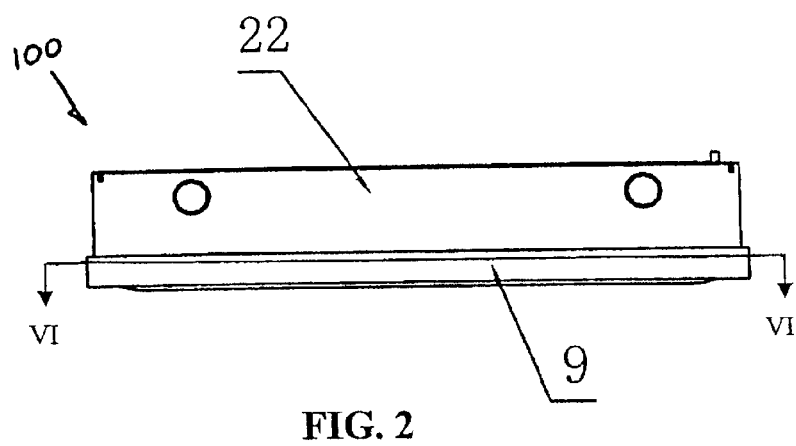
FIG. 2 is a top plan view of the aquarium of FIG. 1.
Figure 3:
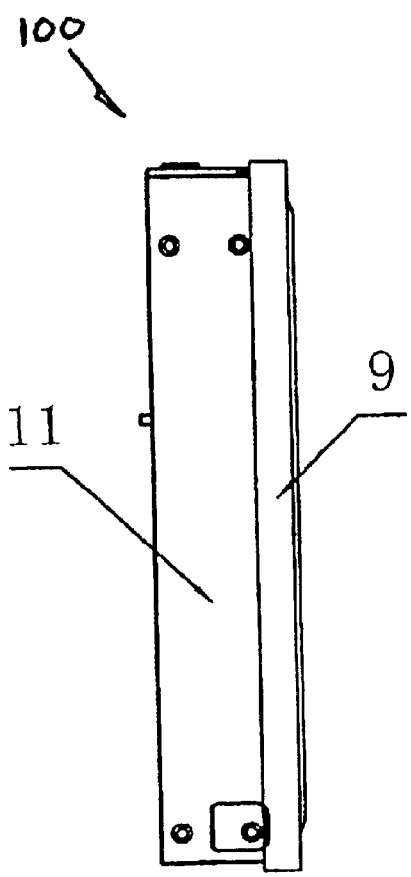
FIG. 3 is a left side view of the aquarium of FIG. 1.
Figure 4:
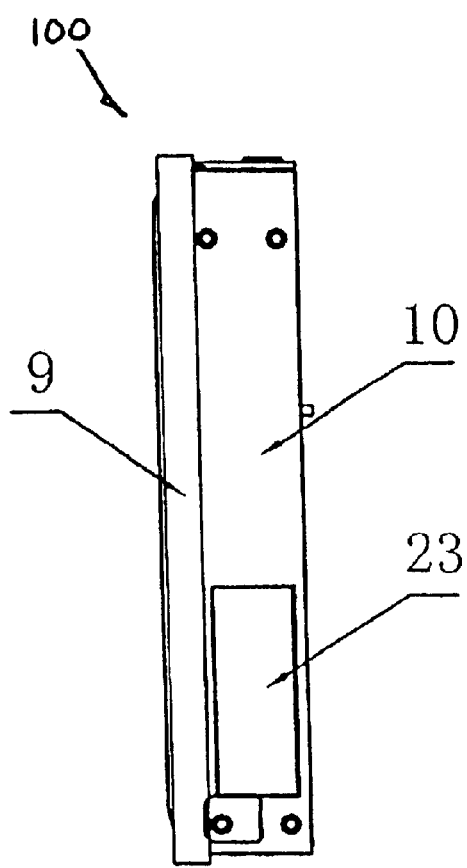
FIG. 4 is a right side view of the aquarium of FIG. 1.
Figure 5:
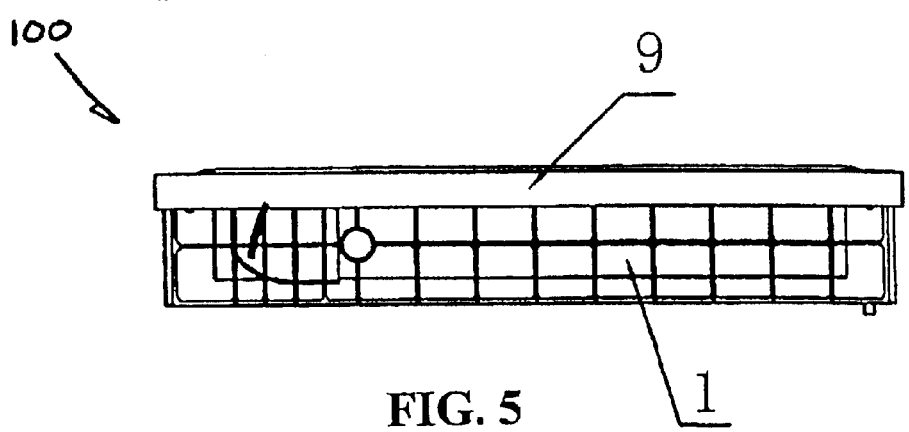
FIG. 5 is a bottom plan view of the aquarium of FIG. 1.

Referring to the drawings, there is shown a wall-mountable aquarium 100 incorporating a background setting embodying the invention, which aquarium 100 includes an integrally moulded plastic tank 1 of a slim square or rectangular structure for containing water to keep living aquatic animals or plants. The tank 1 has a transparent front wall 5, left and right side walls 6 and 7, a rear wall 8 and a bottom wall 14, with the left and right side walls 6 and 7 being considerably narrower than the front and rear walls 5 and 8. A top lid 22 normally closes the tank 1.

The front, rear and bottom walls 5, 8 and 14 extend laterally outwards in opposite directions beyond the side walls 6 and 7. Such extensions, together with a flange 6A/7A that extends outwards from the top end of each side wall 6/7 and across the front and rear walls 5 and 8, define a laterally-open shallow cavity on the side wall 6/7. The cavities are closed by separate oblong covers 11 and 10, whereby two fixed enclosures E1 and E2 are formed on the corresponding side walls 6 and 7 for housing part of accessory for the aquarium 100, such as a water temperature controller 18 in the right enclosure E2. It is possible that a similar enclosure may be formed on the bottom side of the tank 1.

The aquarium 100 includes a square frame 9 attached onto and extending over the entire front wall 5, which conceals both enclosures E1 and E2 and the top and bottom parts of the tank from direct sight from the front. The frame 9 has a central opening 9A, across which a see-through glass pane may be fitted, revealing only the living habitat inside the tank 1 through the front wall 5. A peripheral flange 9B of the frame 9 fits around the frontmost part including the front wall 5 of the tank 1, so that the frame 9 can easily be fixed and aligned in position. The frame 9 may be made in any decorative design such as a picture frame as shown.

The accessory for the aquarium 100 includes a water circulation and filter system, a water temperature control system, an aquarium lamp and the background setting.

The circulation and filter system incorporates a filtering trough 19, a grate 16, a water pump 15 and a pipe 12. The trough 19 is located within the top part of the tank 1, above the water contained therein. The grate 16 lies flat on the bottom of the tank 1. The pump 15 is submerged and placed inside or underneath a left end portion of the grate 16. The trough 19 is hidden behind the top member of the frame 9, whereas the grate 16 and pump 15 are hidden behind the bottom frame member.

The pump 15 has an inlet at the grate 16 and an outlet from which the pipe 12 extends vertically upwards out of water to reach above the trough 19. The pipe 12 is located in a corner of the tank 1 between the left and rear walls 6 and 8, extending upwardly along that corner.

Upon operation, the pump 15 delivers water from the bottom of the tank 1 upward via the pipe 12 into the trough 19. The trough 19 contains filtering material, through which water runs for filtering and then flows back down into the tank 1 via an array of small drain holes 25 at the bottom wall of the trough 19. A relatively shorter end wall 20 of the trough 19 acts as a lateral exit to allow overflow of water back into the tank 1 through a return hole 21 provided just outside the wall 20. As water is circulated into and out of the rough 19 for cleaning, it is agitated and exposed to air and is therefore thus aerated.

The temperature control system is implemented by a heater rod 17 controlled by the controller 18 to operate and keep the water in the tank 1 at a presettable constant temperature. The heater rod 17 is located horizontally inside or underneath the grate 16, also hidden behind the bottom member of the frame 9. An electric cable connects the heater rod 17 to the controller 18 for power supply and control, which runs through a vertical conduit 13. The controller 18 includes a turning knob 18A outside the right cover 10. The conduit 13 is located in a corner of the tank 1 between the right and rear walls 7 and 8, extending upwardly along that corner.

The lamp is provided a florescent tube 24 that is located to extend horizontally within the top part of the tank 1 behind and alongside the filtering trough 19. The tube 24 is therefore also hidden behind the top member of the frame 9.

Most parts of the aquarium accessory are conveniently housed within the top and bottom parts and on the left and right sides of and around the tank 1, at such locations that are concealed by the frame 9 from direct sight from the front. The frame 9 reveals only the living habitat inside the tank 1. The resulting aquarium 100 has an all-in-one neat and tidy structure and, given its slim design, is particularly suitable and intended for use on a wall by using any appropriate mounting means such as wall brackets.

It is envisaged that the pump 15 and pipe 12 can be used outside the tank 1, for example if a more powerful pump is needed, in which case they can be housed inside the left enclosure E1.

The background setting is provided by a water-resistant, plastic sheet 2 printed with a background scenery, typically an undersea scene including coral and plants for example. The sheet 2 is submerged in water and is located by its bottom edge inserted in an upwardly-open fixing groove 3 formed on or in the upper surface of the bottom grate 16. The groove 3 is continuous as shown or may be discontinuous. It extends from the front left tank corner and close to the left wall 6, then turns smoothly to the rear wall 8 and extends therealong, then turns smoothly to the right wall 7 and extends close thereto, and finally terminates at the front right tank corner.

With its bottom edge held by and running along the groove 3, the sheet 2 adopts substantially the same profile to cover generally the entire rear wall 8 and both side walls 6 and 7. The sheet 2 turns smoothly round the corners between the walls 6, 8 and 7 and completely conceals the pipe 12 and conduit 13.

Figure 7:
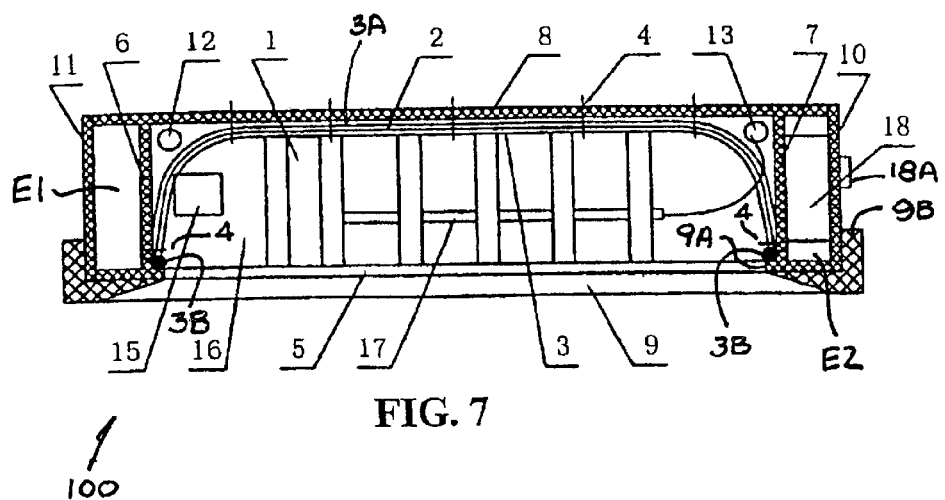
Figure 8:
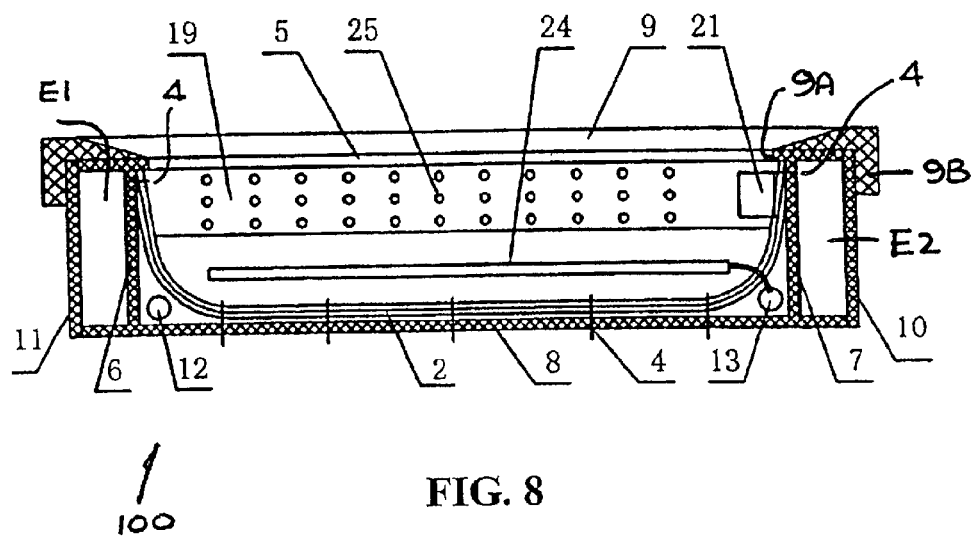
FIG. 8 is a cross-sectional plan view of the aquarium of FIG. 1, taken along line VIII—VIII.

The sheet 2 has seven small holes along its top edge for fixing in position by respective suction cups 4 (only schematically shown in FIGS. 7 and 8), with each cup 4 having an integral stud engaging through the corresponding hole like a rivet. Five of the suction cups 4 are attached on the inner surface of the rear wall 8, and the other two at opposite top corners attached to the left and right side walls 6 and 7. The sheet 2 can easily be set free by simply pulling it off the suction cups 4, whereupon it can be removed for cleaning or replacement by another sheet bearing a different background scenery.

By extending smoothly over the entire rear wall 8 and both side walls 6 and 7, the sheet 2 provides a panoramic wide-screen background scene for enhancing visual effect. The sheet 2 is submerged directly in water to maximise visibility through the front tank wall 5 only and to avoid obscuring by unwanted substance such as moisture or dust, compared with the case where the sheet is located behind the tank or in a double-walled support inside the tank.

The background sheet 2 may be fixed in a number of other ways. In a preferred alternative, a removable mount 3A is used to fixedly support the sheet 2 thereon before they are positioned inside the tank 1. The mount 3A takes the form of a plate or frame that is bent or formed to have the aforesaid profile for extending over the rear and side tank walls 8, 6 and 7, i.e. having a planar middle section and opposite left and right side sections curved smoothly therefrom. The mount 3A may be located by fixing slots (not shown) provided on the left and right side walls 6 and 7, for example.

In another preferred alternative, the background sheet 2 has opposite ends that are wound on a pair of scroll rollers 3B. The rollers 3B are positioned vertically within opposite left and right sides within the tank 1, locating the sheet 2 across them to display the background scenery. The sheet 2 has its top and bottom edges engaged by respective fixing grooves 3, for example, to adopt the aforesaid profile extending over the rear and side tank walls 8, 6 and 7. More than one scenery may be printed on the sheet 2, in which case the background can easily be changed from one scenery to another by simply rotating the rollers 3B.

The invention has been given by way of example only, and various other modifications of and/or alterations to the described embodiment may be made by persons skilled in the art without departing from the scope of the invention as specified in the appended claims.

What is claimed is:

1. A background setting for an aquarium having front and rear walls and opposite left an right side walls, comprising a water-resistant background sheet bearing a background scenery for direct submersion in the water inside a tank of said aquarium to cover said rear wall, and a fixture for fixing the background sheet inside said aquarium, the background sheet being arranged to cover said left and right side walls and being arranged to extend from a front left corner of said tank and close to said left wall, turning smoothly to said rear wall and extending therealong, then turning smoothly to said right wall and extending close thereto, and terminating at a front right corner of said tank, wherein the fixture includes a groove provided at the bottom of said tank, the fixture extending and turning in substantially the same profile as the background sheet and opens upwards for holding a bottom edge of the background sheet.

2. The background setting as claimed in claim 1, wherein the fixture comprises a groove provided at a bottom of said tank, the groove opening upwards for holding a bottom edge of the background sheet.

3. The background setting as claimed in claim 1, wherein the fixture comprises a plurality of suction members for holding a top edge of the background sheet to said tank.

4. The background setting as claimed in claim 3, wherein the top edge of the background sheet has a plurality of holes for engagement by the suction members respectively.

5. The background setting as claimed in claim 1, wherein the fixture comprises a removable mount fixedly supporting the background sheet thereon before they are positioned inside said tank.

6. The background setting as claimed in claim 5, wherein the mount comprises a planar middle section for extending over said rear wall and opposite left and right side sections curved smoothly therefrom for extending over said left and right side walls.

7. The background setting as claimed in claim 1, wherein the fixture comprises a pair of scroll rollers for use within opposite left and right sides of said tank, on which rollers opposite ends of the background sheet are wound.

8. The background setting as claimed in claim 1, wherein the fixture is continuous or discontinuous groove extending and tuning in substantially the same profile as the background sheet.

* * * * *

UNITED STATES PATENT AND TRADEMARK OFFICE
CERTIFICATE OF CORRECTION

PATENT NO.     : 6,834,617 B1
DATED           : December 28, 2004
INVENTOR(S)  : Hsieh et al.

Page 1 of 1

It is certified that error appears in the above-identified patent and that said Letters Patent is hereby corrected as shown below:

Column 1,
Line 24, "structure is also complicate" should read -- structure is also complicated --

Figure 6:
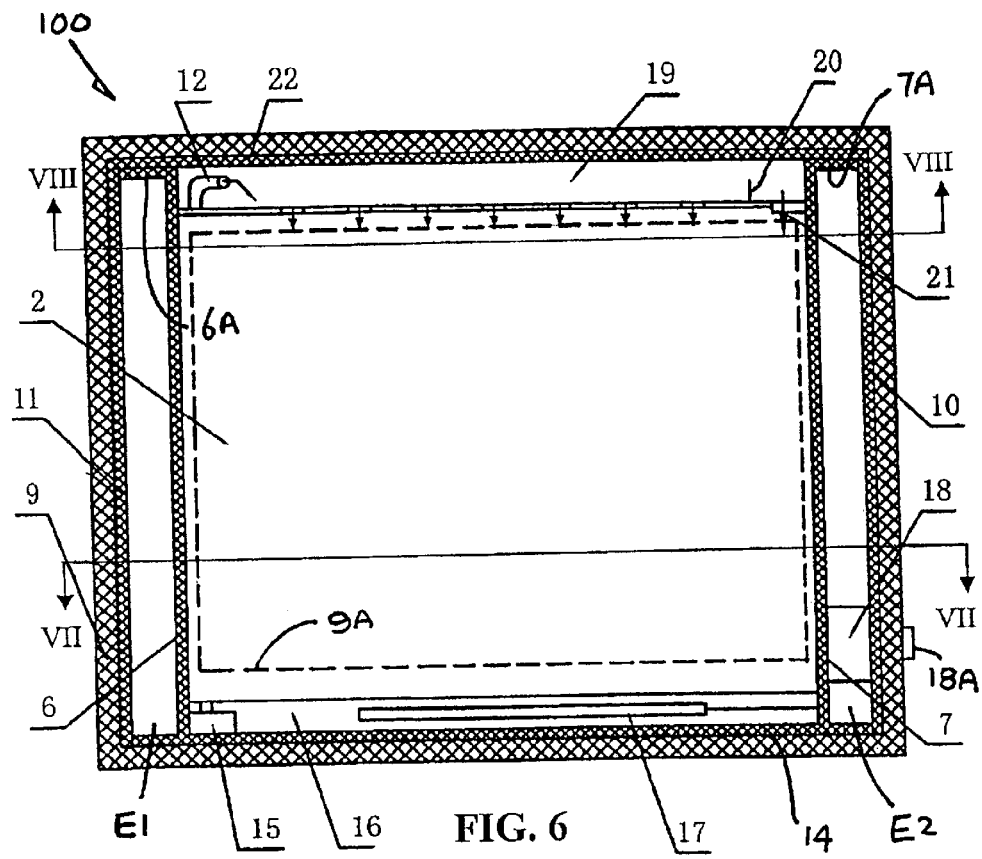
FIG. 6 is a cross-sectional view of the aquarium of FIG. 2, taken along line VI—VI.

Column 2,
Line 22, "FIG. 6 taken along line VII-VII; and" should not be indented
Lines 47-48, "housing part of accessory for" should read -- housing part of the accessory for --

Column 3,
Line 22, "rough 19 for cleaning," should read -- trough 19 for cleaning, --
Line 36, "The lamp is provided a florescent tube" should read -- The lamp provided is a florescent tube --

Column 4,
Line 54, "opposite left an right" should read -- opposite left and right --

Column 6,
Line 13, "is continuous or discontinuous groove extending and tuning in substantially" should read -- is a continuous or discontinous groove extending and turning in substantially --

Signed and Sealed this

Twelfth Day of July, 2005

JON W. DUDAS
*Director of the United States Patent and Trademark Office*